United States Patent [19]

Coté

[11] 4,064,431
[45] Dec. 20, 1977

[54] LAST-FLASH INDICATOR FOR PHOTOFLASH ARRAY

[75] Inventor: Paul T. Coté, Cleveland Heights, Ohio

[73] Assignee: General Electric Company, Schenectady, N.Y.

[21] Appl. No.: 702,663

[22] Filed: July 6, 1976

[51] Int. Cl.² .............................................. G03B 15/02
[52] U.S. Cl. ....................................... 362/4; 354/127; 362/13
[58] Field of Search ..................... 240/1.3; 431/13, 92, 431/95, 95 A; 354/126, 127, 148; 315/69

[56] References Cited

U.S. PATENT DOCUMENTS

| 3,583,841 | 3/1969 | Harvey | 431/13 |
|---|---|---|---|
| 3,692,995 | 9/1972 | Wagner | 240/1.3 |
| 3,728,068 | 4/1973 | Cote | 431/95 |
| 3,935,442 | 1/1976 | Hanson | 240/1.3 |

Primary Examiner—Stephen J. Tomsky
Assistant Examiner—William B. Perkey
Attorney, Agent, or Firm—Norman C. Fulmer; Lawrence R. Kempton; Frank L. Neuhauser

[57] ABSTRACT

A multiple lamp photoflash array of the FlipFlash type having flash-sequencing circuitry for causing the lamps to flash one at a time in response to firing pulses applied to the array. A radiation switch associated with the last lamp to be flashed causes a short circuit across the array's electrical terminals when the last lamp is flashed and actuates a last-flash indicator in the camera.

10 Claims, 4 Drawing Figures

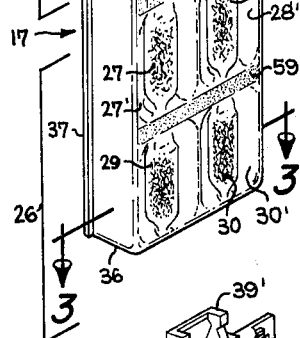
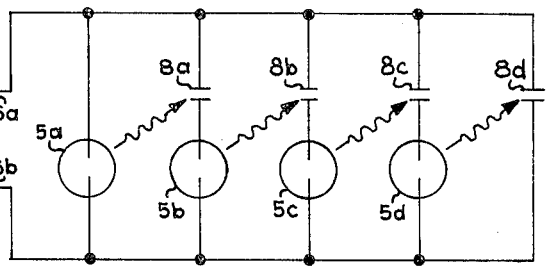
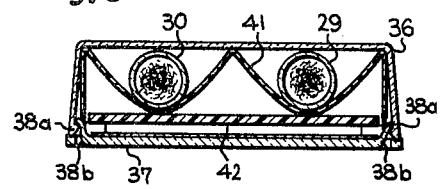
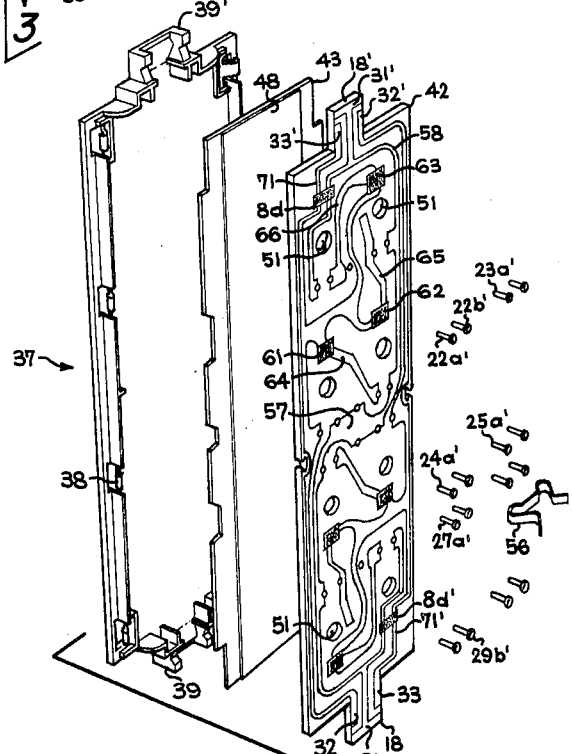
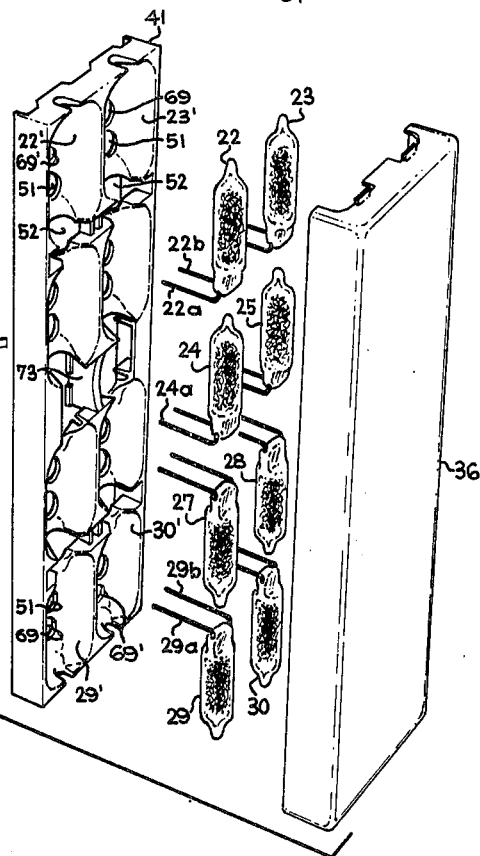

LAST-FLASH INDICATOR FOR PHOTOFLASH ARRAY

BACKGROUND OF THE INVENTION

The invention is in the field of multiple photoflash lamp arrays and last-flash indicators for indicating when the last lamp has been flashed.

An example of a commercially available multiple flash lamp array, known as FlipFlash, is described in U.S. Pat. No. 3,935,442 to James M. Hanson, and comprises an upper group of lamps connected electrically to a connector plug at the bottom of the array adapted to plug into a camera socket for providing flash-firing pulses to the array. Circuitry in the array includes switches respectively actuated by lamps when flashed so as to cause sequential flashing of the lamps, one at a time, in response to the firing pulses. A lower group of flash lamps in the array is connected electrically to a connector plug at the top of the array, so that when the lamps of the upper group have been flashed, the array is turned over and the "lower" group of lamps becomes the upper group which then are flashed. By flashing only an upper group of lamps, in each of the flash array's two positions on the camera, the array reduces the undesirable red-eye effect in which a person's pupils tend to appear red or pink if the flashing lamp is too close to the camera lens. The above-referenced patent discloses flash indicators at the back of the array which change color as the lamps are flashed, thus indicating how many lamps have been flashed and how many have not been flashed.

It would be convenient to have a last-flash indicator visible in the camera viewfinder to indicate when the last lamp of the array has been flashed, and in the case of a FlipFlash type of array to indicate when the last lamp of each half (or group) of the array has been flashed so that the user will be informed that the array should be turned over or a new array should be plugged into the camera.

Several ways have been proposed for providing a last-flash indicator in a camera viewfinder for various types of multiflash units. U.S. Pat. No. 3,380,357 to Donald M. Harvey discloses an arrangement of four indicator lights for indicating how many flash lamps have been flashed in a flashcube using filament-type lamps. Also, U.S. Pat. No. 3,583,841 to Donald M. Harvey discloses an arrangement of indicator lights for indicating how many flash lamps have been flashed in a flashcube using percussively-fired lamps. U.S. Pat. No. 3,707,903 to Kurt H. Weber and U.S. Pat. Nos. 3,668,421 and 3,714,407 to Harry J. Bowers, Jr., disclose arrangements of flashcubes and flash arrays having last-flash actuating rods for actuating a movable last-flash indicator visible in a camera viewfinder.

SUMMARY OF THE INVENTION

Objects of the invention are to provide a last-flash indicator arrangement for indicating in a camera viewfinder when the last lamp has been flashed in a multilamp flash array, or when the last of a group of lamps has been flashed in a FlipFlash type of flash array, and to provide a last-flash indicator which functions electrically via the normal firing-pulse connector terminals of the array and without requiring any additional terminals on the array and in the camera socket for achieving last-flash indication in the camera.

The invention comprises, briefly and in a preferred embodiment, a multiple flash array comprising a group of flash lamps of which one of the lamps is to be flashed last, a pair of connector terminals and means connecting said terminals to the last-to-be-flashed lamp prior to the flashing thereof, and normally open or high resistance switch means connected electrically across the pair of terminals and adapted to close or become a relatively low resistance in response to the flashing of the last-to-flash lamp. The normally open switch may comprise a high resistance radiation-sensitive material connected electrically across the pair of terminals and positioned sufficiently near the last-to-flash lamp so as to become converted to a lower resistance in response to heat and/or light radiation from the last-to-flash lamp when it is flashed. In an array having groups of lamps and a last-to-flash lamp in each group thereof, normally open switches can be positioned respectively adjacent to the last-to-flash lamp of each group. A last-flash indicator can be provided in the camera, electrically connected across the camera's socket contacts which engage the flash array's pair of terminals, to indicate a last flash when the switch associated with the last-flashed lamp is actuated. The last-flash indicator may comprise a circuit including a battery and an indicator light bulb arranged so that the bulb becomes lighted and is visible in the camera's viewfinder when the switch associated with the last-to-flash lamp becomes flashed. The last-flash indicator circuit may be transistorized.

Basically, the last-flash actuated switch in the array has a given value of resistance before the last lamp is flashed and a different value of resistance after the last lamp has been flashed, and the indicator circuit in the camera, if it includes a last-flash indicator light bulb, can be arranged so that the bulb changes from lighted to non-lighted condition, or vice versa, in response to the change in resistance of the last-flash indicator switch in the array when the last lamp flashes.

BRIEF DESCRIPTION OF THE DRAWING

FIG. 1 is an electrical schematic diagram of a preferred embodiment of the invention.

FIG. 2 is a perspective view of a flash array embodying the invention.

FIG. 3 is a cross-sectional view taken on the line 3—3 of FIG. 2.

FIG. 4 is a perspective exploded view of the array of FIG. 2.

DESCRIPTION OF THE PREFERRED EMBODIMENTS

The principles of the invention will be described with reference to FIG. 1, followed by a detailed description of the embodiment shown in FIGS. 2-4.

In FIG. 1, a plurality of electrically fired photoflash lamps $5a$, $5b$, $5c$, and $5d$ are provided in a flash array which is provided with a pair of electrical terminals $6a$ and $6b$ for connection respectively to a pair of camera socket contacts $7a$ and $7b$. The array terminal $6b$ is connected electrically to a lead-in wire of each of the flash lamps $5a$ through $5d$. The array terminal $6a$ is connected electrically to the other lead-in wire of lamp $5a$. Normally open radiation switches $8a$, $8b$, and $8c$ are respectively connected in electrical series between the other lead-in wires of lamps $5b$, $5c$, and $5d$, and the array terminal $6a$, and are respectively positioned sufficiently near the lamps $5a$, $5b$, and $5c$ to receive sufficient light and/or heat radiation therefrom when flashed so as to become converted to a low resistance thereby connecting the array terminal 6a to the next lamp to be flashed. The lamps are open circuits or have a high impedance across their lead-in wires after flashing.

In accordance with the invention, a normally open last-flash indicator radiation switch 8d is connected electrically across the array terminals 6a and 6b, and is positioned sufficiently near the last-to-flash lamp 5d to receive sufficient light and/or heat radiation therefrom when flashed so as to become converted to a low resistance thereby providing a low resistance or short circuit across the array terminals 6a and 6b.

The camera or flash adapter to which the flash array is connected is provided with a firing signal or pulse source for causing the flash lamps to flash. If the flash lamps are high voltage types, requiring a firing pulse voltage of several hundred or a few thousand volts, at low energy, the firing pulse source may comprise a piezoelectric element 9 which is impacted by a hammer device 10 in synchronization with the opening of the camera shutter, thereby generating a firing pulse of 2000 or 3000 volts, for example, which is applied to the socket contacts 7a and 7b and hence to the input terminals 6a and 6b of the flash array. For responding to the actuation of the last-flash indicator switch 8d and indicating at the camera, and preferably in the camera's viewfinder, that the last lamp 5d has been flashed, a circuit is provided comprising a transistor 11 having a base electrode connected via a resistor 12 to the socket contact 7b. A battery 13 and last-flash indicator light bulb 14 are connected in series between the emitter and collector electrodes of the transistor 11, and a diode rectifier 15 is connected between the socket contact 7a and the junction of the battery 13 and indicator light bulb 14. In the particular circuit shown, the transistor 11 is an NPN type, and the piezoelectric element 9, battery 13, and diode 15 are connected with their polarities as shown. In a FlipFlash type of array having another group of flash lamps, another last-flash radiation switch is provided for the last-to-flash lamp of that group.

The last-flash indicator circuit functions as follows. The transistor 11 normally has a high collector-to-emitter impedance, and therefore normally the lamp 14 is not lighted. When the last lamp 5d is flashed, the last-flash indicator switch 8d changes to a low resistance and connects the positive terminal of the battery 13 to the base electrode of the transistor 11, via the diode 15 and resistor 12, thus biasing the transistor so as to have a relatively low collector-to-emitter impedance so that current from the battery 13 causes the indicator lamp 14 to light, thus indicating in the camera viewfinder that the last lamp has been flashed. In one practical construction, the battery 13 is a small 1.5-volt battery, the lamp 14 is a small incandescent lamp which draws 30 milliamperes, the transistor 11 is type 2N3391, and the diode 15 is a low-current, high-voltage rectifier (5000 volts, for example) for blocking the firing pulses of the piezoelectric element 9 from the indicator lamp and battery and transistor. The resistor 12 may have a value of 1000 ohms and functions to limit the transistor's base current to a safe value.

In the embodiment shown in FIGS. 2–4, a multiple flash lamp unit 17 of the planar array type and containing a plurality of electrically fired flash lamps is provided with a plug-in connector tab 18 at the lower end thereof, adapted to fit into a socket of a camera or flash adapter. The lamp array 17 is provided with a second plug-in connector tab 18' at the top end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. Reflectors 22', etc., are disposed behind the respective flash lamps, so that as each lamp is flashed its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect.

The construction of the array comprises front and back housing members 36 and 37, which preferably are made of plastic and are provided with interlocking members 38 which can be molded integrally with the housing members and which lock the housing members together in final assembly to form a unitary flash array structure. FIG. 3 shows a pair of interlocking members 38a carried at the rear of the side of the front housing member 36 interlocked with a pair of interlocking members 38b of the back housing member 37. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (preferably of aluminum-coated plastic) shaped to provide the individual reflectors 22', etc., a printed circuit board 42 provided with integral connector tabs 18 and 18', and an indicia sheet 43 which may be provided with instructions, information 44, trademarks 46, and other indicia such as flash indicators located behind the respective lamps and which change color due to heat and/or light radiation from a flashing lamp, thus indicating at a glance which of the lamps have been flashed and not flashed.

The indicia sheet 43 may be of paper or thin cardboard and provided with openings where the flash indicators are desired, and covered with flash indicator material, such as a sheet-like heat-sensitive plastic material 48, for example biaxially oriented polypropylene, which shrinks or melts when subjected to heat or radiant energy from an adjacent flashing lamp thus effectively changing the color of the openings in the indicia sheet 43. Openings 51 are provided through the reflector unit 41 and the circuit board 42 to facilitate radiation from flashing lamps reaching the flash indicators. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41 and circuit board 42 are substantially the same as the interior height and width of the housing member 36, to facilitate holding the parts in place.

The tab 18, which is integral with the circuit board 42, is provided with a pair of electrical terminals 31 and 32, and similarly the tab 18' is provided with a pair of terminals 31' and 32', for contacting terminals of a camera socket for applying firing voltage pulses to the array. Each of these pairs of terminals corresponds to the pair of terminals 6a, 6b in FIG. 1. Each tab is provided with a third terminal 33 and 33', respectively, which functions to electrically short the circuitry of the inactive lower group of lamps when the array is plugged into a socket. The terminals 31 and 31' are shown as having a lateral "T-bar" configuration for temporarily shorting the socket terminals while the array is being plugged in, to discharge any residual voltage charge in the firing pulse source and also to reduce the likelihood of lamps being accidentally flashed by electrostatic voltage when the array is handled.

The circuit board 42 has a "printed circuit" thereon, as will be described, for causing sequential flashing of the lamps by firing voltage pulses applied to the terminals 31, 32 or 31', 32'. The top and bottom halves of the printed circuitry preferably are reverse mirror images of each other. The lead wires 22a, 22b, etc., of the lamps 22, etc., may be attached to the circuit board 42 in various ways, such as by means of metal eyelets 22a', 22b', etc., placed through openings in the board. The lead wires 22a, 22b, etc., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board.

A clip 56 is clipped onto the reflector member 41, which reflector preferably is made of metal-coated plastic, and the rear of the clip 56 rests in touching contact against an area 57 of an electrical ground circuit run 58 on the board and which includes the terminals 31 and 31' and which makes contact with one of the connector eyelets 22a' or 22b', etc., for each of the lamps 22, etc., whereby the reflector unit 41 additionally functions as an electrically grounded shield.

Areas 59 on the transparent front housing member 36 may be made opaque or partly opaque, such as by making the surface roughened at these areas, to fully or partly conceal the lamp lead-in wires 22a, 22b, etc., and/or the lower portions of the lamps, for improved appearance of the array.

The circuit board terminal 32 is part of a conductor run that is electrically connected to lead-in wire 24a of lamp 24 at the eyelet 24a' and terminates at radiation switches 61, 62, and 63 respectively positioned near lamps 24, 25, and 23 and which correspond to the switches 8a, 8b, and 8c in FIG. 1. A circuit board conductor run 64 is connected electrically to the remaining lead wire of flash lamp 25 at eyelet 25a' and terminates at the radiation switch 61. A circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

The radiation switches 61, 62, and 63 are respectively in contact with and bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around the other connector tab 18' attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 200 volts for example, at low current, for flashing, and they can be fired by impacting or stressing a piezoelectric element in the camera, as described above.

In accordance with the invention, the last-flash indicator radiation switches 8d and 8d' are provided on the circuit board 42 respectively behind the last-to-flash lamps 22 and 30 of each of the groups 21 and 26 of lamps. Window means such as openings 69' are provided in the reflectors 22' and 30' between the lamps 22 and 30 and switches 8d and 8d' to facilitate radiation from the lamps when flashed reaching the switches. The last-flash indicator switches 8d and 8d' can be the same material, and the same size and shape, as the flash-sequencing switches 61, etc. The circuit runs are shaped so that the last-flash indicator switch 8d bridges across and between the circuit run 71 which terminates at the connector terminals 32 and 33, and the common ground circuit run 58 which terminates at the connector terminals 31 and 31', so that when this switch assumes a low or zero value of resistance in response to the flashing of the last lamp 22, it will actuate the last-flash indicator circuit in the camera via its electrical connection thereto through the connector terminals 31 and 32 which have previously functioned to connect firing pulses to the flash lamps. Similarly, the last-flash indicator switch 8d behind the other last-to-flash lamp 30 bridges across and between the common ground circuit run 58 and the circuit run 71' which terminates at the connector terminals 33 and 32', so that when the connector 18' is plugged into the camera the switch 8d' will function as has been described for switch 8d.

The invention achieves its objectives of providing a last-flash indicator in a camera which functions via the normal firing-pulse connector terminals of the flash array and without requiring any additional terminals on the array nor any additional contacts in the camera socket.

While preferred embodiments of the invention have been shown and described, various other embodiments and modifications thereof will become apparent to persons skilled in the art, and will fall within the scope of the invention as defined in the following claims.

What I claim as new and desire to secure by Letters Patent of the U.S. is:

1. A multiple flash array comprising a group of flash lamps of which one of the lamps is to be flashed last, said array being provided with a pair of input signal connector terminals adapted to receive lamp-firing electrical signals for causing said lamps to flash, wherein the improvement comprises last-flash indicator switch means connected electrically between said pair of terminals and having an initial value of impedance and adapted to change to a different value of impedance in response to the flashing of said last-to-flash lamp thereby changing the impedance across said input signal connector terminals to indicate that said last-to-flash lamp has flashed.

2. A flash array as claimed in claim 1, in which said last-flash indicator switch means comprises radiation-sensitive material initially having a relatively high value of impedance across said terminals and positioned to receive radiation from said last-to-flash lamp when it becomes flashed and adapted to become converted by said radiation so as to have a relatively lower value of impedance across said terminals.

3. A flash array as claimed in claim 2, including a reflector positioned between said last-to-flash lamp and said last-flash indicator switch and shaped to direct light from said last-to-flash lamp when it is flashed in a direction away from said last-flash indicator switch, and window means in said reflector to facilitate radiation to reach said last-flash indicator switch from said last-to-flash lamp when it is flashed.

4. A flash array as claimed in claim 3, in which said window means comprises an opening through said reflector.

5. A flash array as claimed in claim 2, including flash-sequencing circuitry comprising a flash-sequencing radiation switch of radiation-sensitive material initially having relatively high value of impedance and positioned to receive radiation from one of said lamps when flashed other than said last-to-flash lamp and adapted to become converted thereby so as to have a relatively lower value of impedance, said circuitry being arranged so that said flash-sequencing switch when converted will cause the next of said lamp-firing electrical signals to be applied to said last-to-flash lamp, said material of the last-flash indicator switch being substantially the same as said material of the flash-sequencing switch.

6. A flash array as claimed in claim 2, including a housing having oppositely disposed first and second ends, said group of flash lamps being positioned in said housing in the half thereof toward said first end thereof and said pair of connector terminals being positioned at said second end of the housing, a second group of flash lamps positioned in said housing in the half thereof toward said second end thereof and of which one of the lamps is to be flashed last, a second pair of connector terminals positioned at said first end of the housing and adapted to receive lamp-firing electrical signals for causing said lamps of the second group to flash, a second last-flash indicator switch means comprising a radiation-sensitive material connected electrically between said second pair of terminals and initially having a relatively high value of impedance across said second pair of terminals and positioned to receive radiation from said last-to-flash lamp of the second group when it becomes flashed and adapted to become converted thereby so as to have a relatively lower value of impedance across said terminals of the second pair.

7. A flash array as claimed in claim 2, in combination with indicator means externally of said array, and means electrically connecting said indicator means across said pair of terminals, said indicator means being responsive to said conversion of the last-flash indicator switch so as to indicate the flashing of said last-to-flash lamp.

8. A combination as claimed in claim 7, in which said indicator means comprises a circuit including a battery and an indicator lamp connected so that said battery causes said indicator lamp to light in response to said conversion of the last-flash indicator switch.

9. A combination as claimed in claim 8, in which said circuit includes a transistor having base, emitter, and collector electrodes, means electrically connecting said base electrode to one of said connector terminals, means connecting said battery and said indicator lamp in series between said emitter and collector electrodes, and means connecting the junction of said indicator lamp and said battery to the other of said connector terminals.

10. A combination as claimed in claim 9, in which the last-named means includes a rectifier.

* * * * *